United States Patent [19]

Giglia

[11] Patent Number: 4,459,332

[45] Date of Patent: Jul. 10, 1984

[54] FLOCKED FABRIC LAMINATE FOR PROTECTION AGAINST CHEMICAL AGENTS

[75] Inventor: Robert D. Giglia, Rye, N.Y.

[73] Assignee: American Cyanamid Company, Stamford, Conn.

[21] Appl. No.: 531,367

[22] Filed: Sep. 12, 1983

[51] Int. Cl.³ .............................................. B32B 33/00
[52] U.S. Cl. ...................................... 428/86; 428/87; 428/90; 428/97; 428/323; 428/367; 428/368; 428/408
[58] Field of Search ................... 428/86, 87, 90, 97, 428/323, 367, 368, 408, 902

[56] References Cited

U.S. PATENT DOCUMENTS 4,411,948 10/1983 Ogino et al. ...................... 428/408

*Primary Examiner*—Marion McCamish
*Attorney, Agent, or Firm*—Frank M. Van Riet

[57] ABSTRACT

An air and water vapor permeable, toxic vapor absorptive fabric material comprising, in superimposed relationship,
(a) a first inactive, woven or non-woven fabric,
(b) a first air and water vapor permeable adhesive layer having activated carbon fiber flocking positioned on the surface thereof away from said (a), and activated carbon powder deposited in the voids formed between said flocking,
(c) a second air and water vapor permeable adhesive layer and
(d) a second, inactive, woven or non-woven fabric.

2 Claims, No Drawings

FLOCKED FABRIC LAMINATE FOR PROTECTION AGAINST CHEMICAL AGENTS

BACKGROUND OF THE INVENTION

The need for protective clothing has long been recognized by both military and commercial personnel. The manufacture and use of certain dangerous chemicals such as pesticides, toxic materials etc. in the form of sprays or mists, gases etc. requires that personnel involved therewith be provided the safest protective clothing available. Protective clothing has, in the past, been manufactured from completely impermeable materials such as plastics or oilskin. These products did not prove sufficient however, due to preventing the egress of heated air and perspiration from the wearer. Other attempts to provide protective clothing involved the use of absorbent charcoal or other materials in particulate form, however, these products also involved difficulties due to the loss of the particulate material over a period of time. The use of quilted woven carbon cloth and adhesives to bind the carbon particles, also was less than commercially successful, see U.S. Pat. Nos. 3,586,596; 3,769,144.

Accordingly, if a fabric configuration could be developed which overcame the disadvantages of previous fabrics, a step forward in the art would be achieved.

SUMMARY OF THE INVENTION

According to the present invention, a fabric material containing, as the toxic vapor absorptive ingredient therein, activated carbon fiber flocking having deposited in the voids formed therebetween, activated carbon powder, is produced whereby products made therefrom are air and water vapor permeable and provide for the user protection from dangerous chemicals in liquid or gaseous form.

DESCRIPTION OF THE INVENTION INCLUDING PREFERRED EMBODIMENTS

In accordance with the present invention, there is provided an air and water vapor permeable, toxic vapor absorptive fabric material comprising, in superimposed relationship, (a) a first inactive, woven or non-woven fabric,
(b) a first air and water vapor permeable adhesive layer having activated carbon fiber flocking positioned on the surface thereof away from said (a) and activated carbon powder deposited in the voids formed between said flocking,
(c) a second air and water vapor permeable adhesive layer and
(d) a second inactive, woven or non-woven fabric.

The fabric materials which are employed as components (a) and (d) of the novel composites of the present invention may be formed, in whole or in part, from such fabric as that produced from cotton, hemp, flax, ramie, jute, silk, wool, leather and including flannel, flannelette, swansdown, poplin, regenerated cellulose such as cellulose ethers, cellulose esters or mixed cellulose ether-esters; nylon, rayon, acetates, polythene, or other synthetic fabrics produced from such materials as vinyl polymers e.g. vinylidene chloride polymers; also mineral fibers such as glass, rock wool, asbestos etc. These fabrics may be non-woven, i.e. include felts, matts, papers and the like in addition to being woven as known in the production of wearing apparel.

The materials which form components (b) and (c) of the composites of the present invention are produced from water vapor and air permeable adhesives. The preferred adhesive components are used in the form of a foam. The foam is formed prior to coating and is open-celled upon curing. It is prepared from such materials as rubber or acrylic latex, polyurethane and the like. The foam is self-adhering, and is cured by the application of heat, to the fabric components (a) and (d). The adhesive layers should range from about 0.2 mm to about 0.5 mm in thickness after curing.

Component (b) of the fabric material is prepared by first coating the fabric component (a) with the adhesive foam. The side coated with the adhesive is then flocked with activated carbon fibers. These activated carbon fibers are well-known in the art as are methods for their production. They are from about 0.3 to about 1.5 mm. in length, preferably from about 0.5 to about 1.2 mm, and can be prepared from such carbon fiber precursors as coal tar pitch, petroleum pitch, coal tar, petroleum derived thermal tar, ethylene tars, high-boiling coal tar distillates, ethylene tar distillates, gas oils or polynuclear aromatics. Also useful as precursors are polymers such as acrylonitrile homopolymers and copolymers, polyvinylalcohol, and natural and regenerated cellulose. Methods for preparing activated carbon fibers useful herein are disclosed in U.S. Pat. Nos. 4,069,277 and 4,285,831, which patents are hereby incorporated herein by reference.

The activated carbon fibers are deposited upon the foam adhesive side of the coated fabric (a) by any known mechanical flocking method, preferably before the adhesive is heat cured. The fiber flocking is usually sprinkled on top of the foam adhesive coating by means of a hopper and the entire assembly is then vibrated by means of a beater bar so as to orient the flocking perpendicular to the adhesive-coated fabric. Excess flocking is removed by vacuum. The resultant fibers are positioned substantially perpendicularly to the adhesive layer.

The flocked fabric is then preferably heated to cure the adhesive and securely bind the fabric and the flocking to the adhesive.

The fiber may also be flocked by known electrostatic methods although the electrical conductivity of the carbon fibers tends to interfer with the production of uniform product and the mechanical flocking method is the preferred one.

To the flocked side of the fabric is then added activated carbon powder having a particle size ranging from about 1 $\mu$m to about 150 $\mu$m, preferably from about 10 $\mu$m to about 80 $\mu$m, while a vacuum is applied from the fabric side to draw the powder into the voids between the flocked carbon fibers. Surplus powder is removed such as with a doctor blade and/or slight shaking.

Component (b) of the composites of the present invention, after being flocked with carbon fibers and treated with deposited carbon powder, should contain from about 15% to about 25% of the carbon fiber and 20% to about 35% of the carbon powder.

The fabric comprising component (d) of the present invention is preferably the same as that used as component (a) however different fabrics may be used. Component (d) is coated with a second air and water vapor permeable adhesive layer which again is preferably the same as that used as component (b), however, different adhesives may be used.

In forming the composite article hereof, component (d) is coated with component (c) and then pressed against the active carbon surface of component (b). The resultant laminated composite is thereafter heated in an oven to cure the foam adhesive (c) and thereby form the completed composite.

The outer surfaces of components (a) and (d) may be rendered hydrophobic by coating with porous silicone film or a polymer such as polytetrafluoroethylene. Additionally, a reactive coating capable of decomposing toxic agents e.g. a coating of a sulfonated polymer to hydrolyze nerve gas, may be applied to the outer surface of component (a) or (d) so that the active carbon fibers and particles act as a second line of defense.

The flocked carbon fibers of the fabric materials of the present invention serve as a spacing medium providing pockets for the activated carbon powder to fill as well as structural support by tying the outer fabric layers to each other via the adhesive components. The combination of the active carbon fiber and the active carbon powder provides the highest density of active carbon for a given thickness. Because the activated carbon fibers are positioned substantially perpendicularly to the outer fabric layers, they form channels in the carbon powder thereby contributing to the transport of air and water vapor through the composite. Bonding both ends of the carbon fiber flocking contributes to good composite strength and prevents non-uniform accumulation of the active carbon powder as the composite is flexed.

The composite fabrics of the present invention have a wide variety of uses. They are useful for protective purposes and for filtration and separation of gases. The uses include the manufacture of the composite fabric into wearing apparel e.g. military uniforms; blankets, sleeping bags, bedding, surgical dressings, wrappers and containers, covers, tarpaulins, tents, curtains, gas masks, paint spraying masks, air-conditioning duct filters, flue gas deodorizers and the like.

The following examples are set forth for purposes of illustration only and are not to be construed as limitations on the present invention except as set forth in the appended claims. All parts and percentages are by weight unless otherwise specified.

EXAMPLE 1

Active carbon fiber is cut into 0.9 mm lengths. A 65/35 polycotton woven cloth is coated with a commercially available acrylic latex foam adhesive and the carbon fiber is deposited on the adhesive layer using a mechanical flocking apparatus. The flocked cloth is then heated to 90° C. for one hour followed by 10 minutes at 120° C. to cure the adhesive. Active carbon particles are added to the carbon fiber surface while a vacuum is applied from the cloth side to draw the particles into the voids between the carbon fibers. Surplus particles are removed from the surface with a doctor blade and the sheet is then lightly shaken to remove loose particles. The resultant sheet contains 16.5% active carbon fiber and 32.1% active carbon particles. A nylon twill cloth (5½ oz.) is then coated with another portion of the same acrylic latex foam adhesive set forth above and pressed against the active carbon surface of the polycotton cloth. The resultant laminated fabric material is then heated in an oven at 90° C. for one hour followed by ten minutes at 128° C. to cure and foam the adhesive.

Air permeability on the resultant article measures 75 seconds/100 cc. by the Gurley-Hill S-P-S tester. Toxic vapor sorption capacity is evaluated by passing a mixture of $N_2/CCl_4$ through the article at a rate of 10 ml/min./cm$^2$. The upstream concentration of $CCl_4$ is 5 mg/l. The fabric reduces the concentration to below 1 mg/l for 16 minutes.

EXAMPLE 2

The procedure of Example 1 is again followed except that the polycotton and nylon cloths are replaced by flannel. Similar results are achieved.

EXAMPLE 3

Replacement of the acrylic latex adhesive of Example 1 with a commercially available foamable polyurethane adhesive produces a fabric article of substantially identical properties.

We claim:
1. An air and water permeable, toxic vapor absorptive fabric material comprising, in superimposed relationship,
   (a) a first inactive, woven or non-woven fabric,
   (b) a first air and water permeable open-celled adhesive foam layer having activated carbon fiber flocking positioned substantially perpendicularly to the surface thereof away from said (a) and activated carbon powder deposited in the voids formed between said flocking,
   (c) a second air and water vapor permeable open-celled adhesive foam layer and
   (d) a second inactive, woven or non-woven fabric.
2. A material in accordance with claim 1 wherein said voids are substantially filled with said carbon powder.

* * * * *